United States Patent
Wu

(10) Patent No.: US 11,126,777 B2
(45) Date of Patent: Sep. 21, 2021

(54) LAYOUT ROUTING STRUCTURE AND LAYOUT ROUTING METHOD FOR IMPROVING SI PERFORMANCE OF SIGNAL

(71) Applicant: ZHENGZHOU YUNHAI INFORMATION TECHNOLOGY CO., LTD., Henan (CN)

(72) Inventor: Ning Wu, Henan (CN)

(73) Assignee: ZHENGZHOU YUNHAI INFORMATION TECHNOLOGY CO., LTD., Henan (CN)

(*) Notice: Subject to any disclaimer, the term of this patent is extended or adjusted under 35 U.S.C. 154(b) by 518 days.

(21) Appl. No.: 16/097,235

(22) PCT Filed: Nov. 30, 2017

(86) PCT No.: PCT/CN2017/113860
§ 371 (c)(1),
(2) Date: Oct. 26, 2018

(87) PCT Pub. No.: WO2019/000834
PCT Pub. Date: Jan. 3, 2019

(65) Prior Publication Data
US 2021/0224461 A1    Jul. 22, 2021

(30) Foreign Application Priority Data
Jun. 29, 2017  (CN) .......................... 201710515744.0

(51) Int. Cl.
*G06F 30/30*     (2020.01)
*H05K 1/00*      (2006.01)
(Continued)

(52) U.S. Cl.
CPC ......... *G06F 30/394* (2020.01); *H05K 1/0245* (2013.01); *G06F 2115/12* (2020.01);
(Continued)

(58) Field of Classification Search
CPC ............... H05K 1/0216; H05K 1/0245; H05K 2201/09236; G06F 30/394; G06F 2115/12; G06F 2119/10
See application file for complete search history.

(56) References Cited

U.S. PATENT DOCUMENTS 7,102,455 B2*  9/2006  Lin .......................... H01P 3/02
                                                           333/1
7,343,576 B2*  3/2008  Brist .................... H05K 1/0366
                                                          174/257
(Continued)

FOREIGN PATENT DOCUMENTS

CN      102131339 A      7/2011
CN      203675423 U      6/2014
(Continued)

OTHER PUBLICATIONS

A. Chada et al., "Novel Periodic Routing to Mitigate Floquet Mode Resonances in Crosstalk Transfer Function due to Periodically Routed Structures," 2016 IEEE 66th Electronic Components and Technology Conference, pp. 2251-2256. (Year: 2016).*
(Continued)

*Primary Examiner* — Leigh M Garbowski
(74) *Attorney, Agent, or Firm* — Yue (Robert) Xu; Apex Attorneys at Law, LLP

(57) ABSTRACT

A layout routing structure and a layout routing method for improving an SI performance of a signal are provided. Each of two positive and negative differential traces on a PCB includes multiple segments D1, multiple segments D2 and multiple segments D3. In each of the two differential traces, the segment D1 and the segment D2 are staggered and parallel to each other, the segment D2 is routed between any two segments D1, and any two adjacent segments D1 and D2 are connected by the segment D3. In one of the two differential traces, all of the segments D1 are routed on the glass cloth, and all of the segments D2 are routed on the epoxy resin. In the other of the two differential traces, all of the segments D1 are routed on the epoxy resin, and all of the segments D2 are routed on the glass cloth.

9 Claims, 3 Drawing Sheets

(51) Int. Cl.
 *G06F 30/394* (2020.01)
 *H05K 1/02* (2006.01)
 *G06F 115/12* (2020.01)
 *G06F 119/10* (2020.01)

(52) U.S. Cl.
 CPC ........ *G06F 2119/10* (2020.01); *H05K 1/0216* (2013.01); *H05K 2201/09236* (2013.01)

(56) References Cited

U.S. PATENT DOCUMENTS

| | | | |
|---|---|---|---|
| 8,124,884 B2* | 2/2012 | Chen | H05K 1/0245 |
| | | | 174/261 |
| 9,338,882 B2* | 5/2016 | Xiao | H05K 1/0245 |
| 2011/0168437 A1 | 7/2011 | Chen et al. | |
| 2018/0014402 A1 | 1/2018 | Kashiwakura | |

FOREIGN PATENT DOCUMENTS

| | | | |
|---|---|---|---|
| CN | 104244574 A | 12/2014 | |
| CN | 107315878 A | 11/2017 | |
| WO | 2016117320 A1 | 7/2016 | |

OTHER PUBLICATIONS

C. Wang et al., "Optimum Rotation Angle for Mitigating Differential Skew Induced by Glass Cloth in PCBs," ICEP-IAAC 2018 Proceedings, Apr. 17-21, Mie, Japan, pp. 328-332. (Year: 2018).*
International Search Report for PCT/CN2017/113860 dated Mar. 27, 2018, ISA/CN.

* cited by examiner 106　　　　　　　　1080　　　　　　　2113

LAYOUT ROUTING STRUCTURE AND LAYOUT ROUTING METHOD FOR IMPROVING SI PERFORMANCE OF SIGNAL

This application is a national phase application of PCT international patent application PCT/CN2017/113860, filed on Nov. 30, 2017 which claims the priority to Chinese Patent Application No. 201710515744.0, titled "LAYOUT ROUTING STRUCTURE AND LAYOUT ROUTING METHOD FOR IMPROVING SI PERFORMANCE OF SIGNAL", filed on Jun. 29, 2017 with the Chinese Patent Office, both of which are incorporated herein by reference in their entireties

FIELD

The present disclosure relates to the technical field of PCB design, and particularly to a layout routing structure and a layout routing method for improving Signal Integrity SI performance of a signal.

BACKGROUND

In current mainboard design, in order to reduce an influence of a composition and structure of a board on transmission performance of a signal in a high-speed trace, the structure of the board is generally changed, and a cloth spreading board is used. That is, a pressure process is performed on a glass cloth cluster of the board, to make the glass cloth cluster spread all around, so as to eliminate a gap between the vertical glass cloth and the horizontal glass cloth which intersect with each other, and to reduce a difference between dielectric constant DK values of points on the board.

In another way, the conventional board is still used, and in PCB design, all of high-speed traces are routed as oblique traces with an angle of 10°, to reduce an influence of a DK difference in high-speed differential traces P and N on consistency of transmission delays of signals. Although development cost of the board is effectively reduced with the manner of routing oblique traces with the angle of 10°, the complexity of layout routing is increased, and the design cycle of the PCB is prolonged.

In a case that long-distance routing is required, difficulty of routing oblique traces in limited structure space is higher than difficulty of routing oblique traces in large structure space. Therefore, in a case that the oblique traces are routed in the limited structure space, a considerable investment of time and effort is required for routing, to implement the PCB design which meets an SI transmission requirement of the signal.

SUMMARY

An objective of the present disclosure is to provide a layout routing structure and a layout routing method for improving an SI performance of a signal, to solve problems in PCB design that layout routing is complicated, development cost is high, and there is a difference of SI performances of signals in two differential traces at a signal receiving terminal of a device.

The following technical solutions are provided in the present disclosure, to solve the technical problems.

A layout routing structure for improving an SI performance of a signal is provided, which includes a PCB made of a glass cloth and epoxy resin, and two positive and negative differential traces on the PCB. Each of the two positive and negative differential traces includes multiple segments D, multiple segments D2 and multiple segments D3. In each of the two differential traces, the segment D1 and the segment D2 are staggered, the segment D2 is routed between any two segments D1, and any two adjacent segments D1 and D2 are connected by the segment D3. In one of the two differential traces, all of the segments D1 are routed on the glass cloth, and all of the segments D2 are routed on the epoxy resin. In the other of the two differential traces, all of the segments D1 are routed on the epoxy resin, and all of the segments D2 are routed on the glass cloth. The two differential traces are parallel to each other.

Furthermore, in each of the two differential traces, an angle between the segment D1 and the segment D3 is equal to 135° or 45°, and an angle between the segment D2 and the segment D3 is equal to 45° or 135°.

Furthermore, in each of the differential traces, for the same segments D3, an angle between the segment D2 which is connected to the segment D3 and the segment D3 is equal to 45° if an angle between the segment D1 which is connected to the segment D3 and the segment D3 is equal to 135°, and an angle between the segment D2 which is connected to the segment D3 and the segment D3 is equal to 135° if an angle between the segment D1 which is connected to the segment D3 and the segment D3 is equal to 45°.

Furthermore, a length of each of the segments D1 is equal to a length of each of the segments D2.

Furthermore, a combination mode of the glass cloth and the epoxy resin on the PCB includes a 106 combination mode, a 1080 combination mode, and a 2113 combination mode.

A layout routing method for improving an SI performance of a signal is further provided, which includes: horizontally routing with a fixed offset in each of two positive and negative differential traces which are parallel to each other on a PCB.

Furthermore, the horizontally routing with the fixed offset includes: routing multiple segments D1, multiple segments D2 and multiple segments D3 for each of the two positive and negative differential traces on the PCB. In each of the two differential traces, the segment D1 and the segment D2 is staggered, the segment D2 is routed between any two segments D1, and any two adjacent segments D1 and D2 are connected by the segment D3. In one of the two differential traces, all of the segments D1 are routed on the glass cloth, and all of the segments D2 are routed on the epoxy resin. In the other of the two differential traces, all of the segments D1 are routed on the epoxy resin, and all of the segments D2 are routed on the glass cloth. The two differential traces are parallel to each other.

Furthermore, in each of the two differential traces, an angle between the segment D1 and the segment D3 is equal to 135° or 45°, and an angle between the segment D2 and the segment D3 is equal to 45° or 135°. For the same segments D3, an angle between the segment D2 which is connected to the segment D3 and the segment D3 is equal to 45° if an angle between the segment D1 which is connected to the segment D3 and the segment D3 is equal to 135°, and an angle between the segment D2 which is connected to the segment D3 and the segment D3 is equal to 135° if an angle between the segment D1 which is connected to the segment D3 and the segment D3 is equal to 45°. A length of each of the segments D1 is equal to a length of each of the segments D2.

Furthermore, a combination mode of the glass cloth and the epoxy resin on the PCB includes a 106 combination mode, a 1080 combination mode, and a 2113 combination mode.

The above content of the present disclosure provides statements of the embodiments of the present disclosure, rather than the present disclosure.

Effects of the embodiments, rather than all effects of the present disclosure, are provided in the above content of the present disclosure. One of the above technical solutions has the following advantages or beneficial effects.

With reference to three combination modes of glass cloth and epoxy resin on a PCB, a manner of routing a horizontal or vertical high-speed differential trace with a fixed offset is provided, to compensate for a transmission delay between signals in the two positive and negative differential traces in a differential coupling pair, so that the signals in the two positive and negative differential traces are transmitted to the receiving end of the device with the same delay, thereby reducing a risk of converting differential mode noise to common mode noise, and enhancing an SI performance of a high-speed signal transmitted for a long distance.

Also, the existing un-spreading board may be used, and the traces are routed horizontally or vertically with layout routing, thereby reducing complexity of layout routing in PCB design while controlling development cost of the PCB, shortening a development cycle for designing the PCB, and improving design efficiency of the PCB.

In each of the differential traces, an angle between the segment D1 and the segment D3 is set to be 135° or 45°, and an angle between the segment D2 and the segment D3 is set to be 45° or 135°, thereby reducing capacitance, impedance and crosstalk, and further improving the SI performance of the signal.

DETAILED DESCRIPTION

Figure 1:
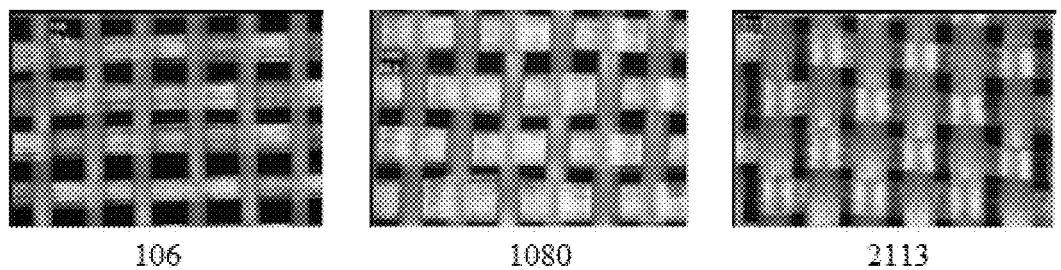
FIG. 1 is a schematic structural diagram of three combination modes of a glass cloth and epoxy resin in a PCB in the conventional technology.

In order to clarify the technical characteristics of the technical solutions, the present disclosure are described in detail based on the embodiments in conjunction with drawings of the embodiments. Many different embodiments or examples are provided hereinafter to implement different structures of the present disclosure. In order to simplify the present disclosure, components and settings in specific examples are described hereinafter. In addition, reference numbers and/or letters may be repeatedly used in different examples of the present disclosure. This repeated usage is only intended for simplification and clarity, rather than indicating a relationship between the various disclosed embodiments and/or settings. It should be noted that the components shown in the drawings may not be drawn in scale. The description for the known components, processing technologies and processes is omitted in the present disclosure, to avoid unnecessarily restricting the present disclosure.

In developing a server product, although the same type of high-speed traces has the same layout trace length on a PCB, SI performances of signals in the high-speed traces are different in proofing and measuring. It can be found by cutting the PCB that the PCB is made of a glass cloth and epoxy resin. A vertical glass cloth and a horizontal glass cloth are woven to intersect with each other. A gap between the glass clothes is filled with the epoxy resin, for realizing insulation. There are three combination modes of the glass cloth and the epoxy resin in the conventional PCB, as shown in FIG. 1.

Figure 2:
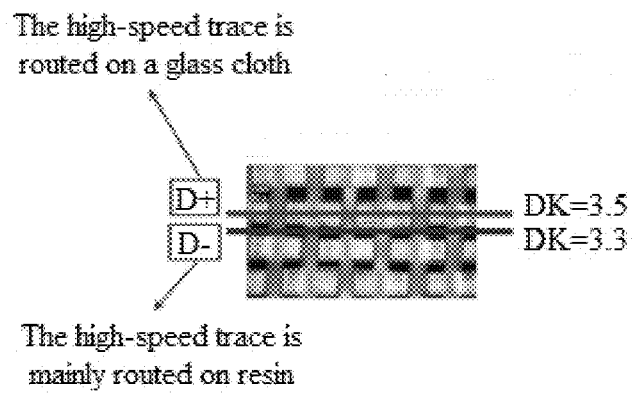
FIG. 2 is a schematic diagram showing DK values of SI signals in the glass cloth and the epoxy resin in the conventional technology.

As shown in FIG. 2, one trace of two positive and negative differential traces is mainly routed on the glass cloth, and the other trace is mainly routed on the epoxy resin. Based on characteristics of the board, a DK value of the glass cloth is greater than a DK value of the epoxy resin. Therefore, equivalent DK values of the positive and negative differential traces are different, and SI performances of outputted signals are also different.

If each of the two positive and negative differential traces is routed on the glass cloth or the epoxy resin, the equivalent DK values are equal to each other, but a distance between the two traces is large, and magnetic fields in the two traces are different, which easily results in a poor SI performance of the outputted signals.

Figure 3:
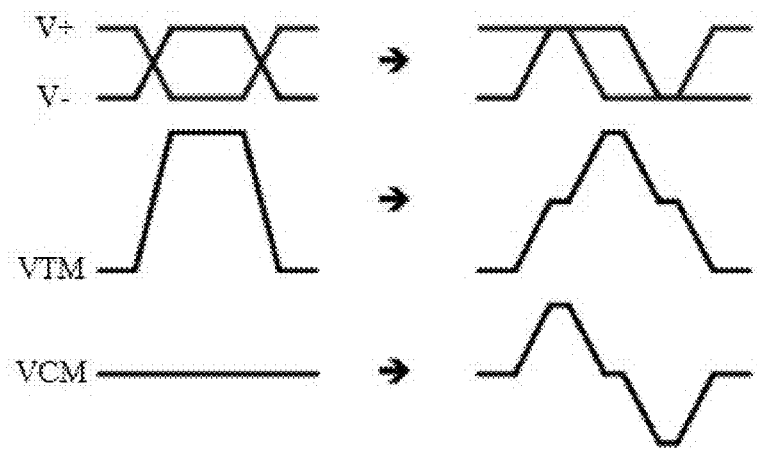
FIG. 3 is a schematic curve diagram of SI signals in differential traces at an input terminal and an output terminal of a device in the conventional technology.

Reference is made to a formula FIG. 1 as follows:

$$v = \frac{12}{\sqrt{DK}},$$

where v represents a signal trace speed, and DK represents a dielectric constant of the board. If DK values of the positive trace and the negative trace in the differential pair are different, transmission speeds of signals in the two coupling traces are different, which influences SI performances of the differential signals at a receiving end of the device. That is, an effective differential signal is weakened directly, and common mode noise interference is enhanced. The influence becomes serious with the increase of a trace length of the differential traces on the PCB. FIG. 3 is a schematic curve diagram showing SI signals in the differential traces at an input terminal and an output terminal of the device. Since transmission speeds of signals on the positive trace and the negative trace in the differential trace pair are different, the differential signals are weakened and energy of common mode noise is enhanced.

What is described above is the conventional technology.

Figure 4:
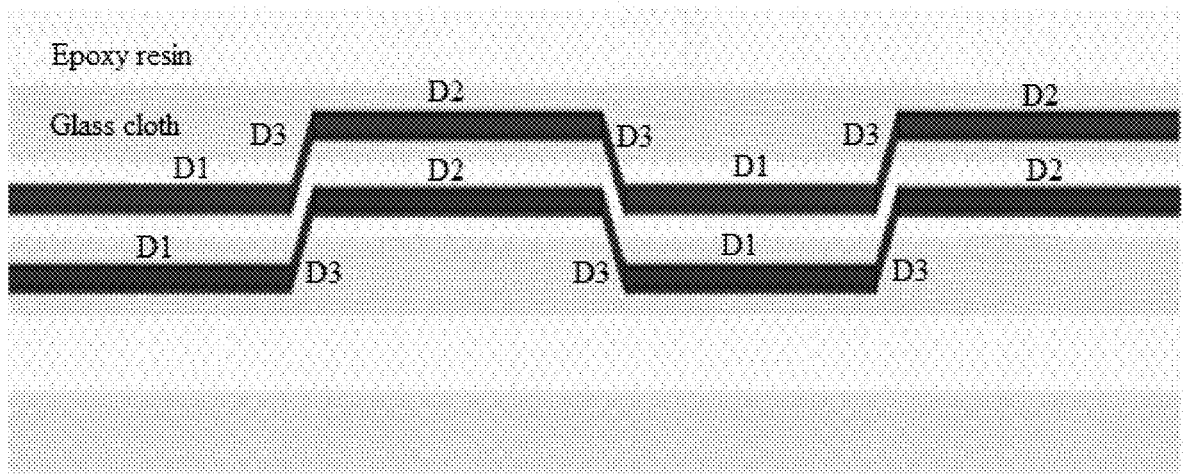
FIG. 4 is a schematic diagram showing a routing structure of differential traces in a PCB according to an embodiment of the present disclosure.

In order to reduce an influence of a structure of the PCB on the SI transmission performance of the high-speed signal in layout routing, a layout routing structure and a layout routing method for improving an SI performance of a signal are provided in the present disclosure. As shown in FIG. 4, in conjunction with the 106 combination mode, the 1080 combination mode, and the 2113 combination mode of the glass cloth and the epoxy resin on the PCB, in a schematic diagram showing a routing structure of differential traces on the PCB according to an embodiment of the present disclosure, each of two positive and negative differential traces on the PCB includes multiple segments D1, multiple segments D2 and multiple segments D3. In each of the two traces, the segment D1 and the segment D2 are staggered, and the segment D2 is routed between any two segments D1, and any two adjacent segments D1 and D2 are connected by the segment D3. In one of the two traces, all of the segments D1 are routed on the glass cloth, and all of the segments D2 are routed on the epoxy resin. In the other of the two traces, all of the segments D1 are routed on the epoxy resin, and all of the segments D2 are routed on the glass cloth. In order that the signals have the same transmission speed and influences of other factors is reduced, the two differential traces are parallel to each other.

In each of the differential traces, an angle between the segment D1 and the segment D3 is equal to 135° or 45°, and an angle between the segment D2 and the segment D3 is equal to 45° or 135°. In each of the differential traces, for the same segment D3, an angle between the segment D2 which is connected to the segment D3 and the segment D3 is equal to 45° if an angle between the segment D1 which is connected to the segment D3 and the segment D3 is equal to 135°, and an angle between the segment D2 which is connected to the segment D3 and the segment D3 is equal to 135° if the angle between the segment D1 which is connected with the segment D3 and the segment D3 is equal to 45°.

In each of the differential traces, a length of each of the segments D1 is equal to a length of each of the segments D2, to compensate for a transmission difference of signals on the two positive and negative coupling traces in the differential pair, and ensure that the signals in the positive and negative traces are transmitted to the receiving end of the device with the same delay, thereby reducing a possibility of converting differential mode noise to common mode noise and improving the SI performance of the differential signal transmitted in a long-distance trace.

The DK values of the positive trace and the negative trace in the differential traces are exchanged equivalently based on an offset of the traces, thereby ensuring that signals on the positive trace and the negative trace have the same transmission speed.

Figure 5:
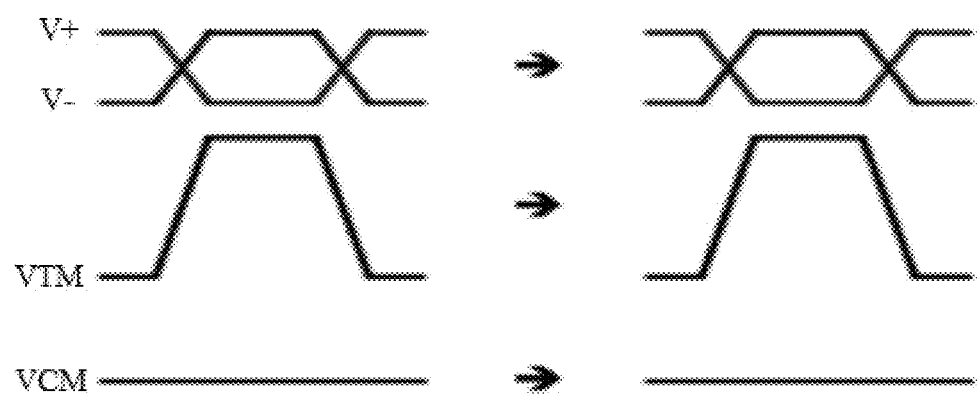
FIG. 5 is a schematic curve diagram of SI signals at an input terminal and an output terminal of a device in a structure according to an embodiment of the present disclosure.

An effect shown in FIG. 5 is realized using the routing structure shown in FIG. 4, in which, energy of both differential mode noise and common mode noise is controlled when the differential signals are transmitted to the receiving end of the device through a long-distance trace.

The layout routing method for improving an SI performance of a signal includes horizontally routing with a fixed offset in each of two positive and negative differential traces which are parallel to each other on a PCB.

The horizontally routing with a fixed offset includes routing multiple segments D1, multiple segments D2 and multiple segments D3 for each of the two positive and negative differential traces on the PCB. In each of the differential traces, the segment D1 and the segment D2 are staggered, and the segment D2 is routed between any two segments D1, and any two adjacent segments D1 and D2 are connected by the segment D3. In one of the differential traces, all of the segments D1 are routed on the glass cloth, and all of the segments D2 are routed on the epoxy resin. In the other of the differential traces, all of the segments D1 are routed on the epoxy resin, and all of the segments D2 are routed on the glass cloth. The two differential traces are parallel to each other.

For each of the differential traces, an angle between the segment D1 and the segment D3 is equal to 135° or 45°, and an angle between the segment D2 and the segment D3 is equal to 45° or 135°. For the same segment D3, an angle between the segment D2 which is connected to the segment D3 and the segment D3 is equal to 45° if an angle between the segment D1 which is connected with the segment D3 and the segment D3 is equal to 135°, and an angle between the segment D2 which is connected to the segment D3 and the segment D3 is equal to 135° if an angle between the segment D1 which is connected with the segment D3 and the segment D3 is equal to 45°. A length of each of the segments D1 is equal to a length of each of the segments D2.

A combination mode of the glass cloth and the epoxy resin on the PCB includes a 106 combination mode, a 1080 combination mode, and a 2113 combination mode.

Only preferred embodiments of the present disclosure are described above. For those skilled in the art, multiple improvements and modifications can be made without departing from the principle of the present disclosure. These improvements and modifications are considered to be in the protection scope of the present disclosure.

The invention claimed is:

1. A layout routing structure for improving an SI performance of a signal, comprising:
   a PCB made of glass cloth and epoxy resin; and
   two positive and negative differential traces on the PCB, wherein each of the two positive and negative differential traces comprises a plurality of segments D1, a plurality of segments D2 and a plurality of segments D3,
   wherein in each of the two differential traces, the segment D1 and the segment D2 are staggered, and the segment D2 is routed between any two segments D1, and any two adjacent segments D1 and D2 are connected by the segment D3,
   in one of the two differential traces, all of the segments D1 are routed on the glass cloth, and all of the segments D2 are routed on the epoxy resin, and in the other of the two differential traces, all of the segments D1 are routed on the epoxy resin, and all of the segments D2 are routed on the glass cloth, and
   the two differential traces are parallel to each other.

2. The layout routing structure for improving the SI performance of the signal according to claim 1, wherein in each of the two differential traces, an angle between the segment D1 and the segment D3 is equal to 135° or 45°, and an angle between the segment D2 and the segment D3 is equal to 45° or 135°.

3. The layout routing structure for improving the SI performance of the signal according to claim 2, wherein in each of the differential traces, for the same the segments D3, an angle between the segment D2 which is connected to the segment D3 and the segment D3 is equal to 45° if an angle between the segment D1 which is connected to the segment D3 and the segment D3 is equal to 135°, and an angle between the segment D2 which is connected to the segment D3 and the segment D3 is equal to 135° if an angle between the segment D1 which is connected to the segment D3 and the segment D3 is equal to 45°.

4. The layout routing structure for improving the SI performance of the signal according to claim 3, wherein a length of each of the plurality of segments D1 is equal to a length of each of the plurality of segments D2.

5. The layout routing structure for improving the SI performance of the signal according to claim 1, wherein a combination mode of the glass cloth and the epoxy resin on the PCB comprises a 106 combination mode, a 1080 combination mode and a 2113 combination mode.

6. A layout routing method for improving an SI performance of a signal used for the structure according to claim 1, comprising:
  horizontally routing with a fixed offset in each of the two positive and negative differential traces which are parallel to each other on the PCB.

7. The layout routing method for improving the SI performance of the signal according to claim 6, wherein the horizontally routing with the fixed offset comprises:
  routing the plurality of segments D1, the plurality of segments D2 and the plurality of segments D3 for each of the two positive and negative differential traces on the PCB,
  wherein in each of the two differential traces, the segment D1 and the segment D2 are staggered, the segment D2 is routed between any two segments D1, and any two adjacent segments D1 and D2 are connected by the segment D3,
  in one of the two differential traces, all of the segments D1 are routed on the glass cloth, and all of the segments D2 are routed on the epoxy resin, and in the other of the two differential traces, all of the segments D1 are routed on the epoxy resin, and all of the segments D2 are routed on the glass cloth, and
  the two differential traces are parallel to each other.

8. The layout routing method for improving the SI performance of the signal according to claim 7, wherein in each of the two differential traces, an angle between the segment D1 and the segment D3 is equal to 135° or 45°, and an angle between the segment D2 and the segment D3 is equal to 45° or 135°,
  for the same segments D3, an angle between the segment D2 which is connected to the segment D3 and the segment D3 is equal to 45° if an angle between the segment D1 which is connected to the segment D3 and the segment D3 is equal to 135°, and an angle between the segment D2 which is connected to the segment D3 and the segment D3 is equal to 135° if an angle between the segment D1 which is connected to the segment D3 and the segment D3 is equal to 45°, and
  a length of each of the plurality of segments D1 is equal to a length of each of the plurality of segments D2.

9. The layout routing method for improving the SI performance of the signal according to claim 8, wherein a combination mode of the glass cloth and the epoxy resin on the PCB comprises a 106 combination mode, a 1080 combination mode and a 2113 combination mode.

* * * * *